(12) United States Patent
Soffer et al.

(10) Patent No.: US 10,171,540 B2
(45) Date of Patent: Jan. 1, 2019

(54) METHOD AND APPARATUS FOR STREAMING VIDEO SECURITY

(75) Inventors: Aviv Soffer, Caesarea (IL); Oleg Vaisband, Kiryat Yam (IL)

(73) Assignee: HIGH SEC LABS LTD, Yokneam (IL)

( * ) Notice: Subject to any disclaimer, the term of this patent is extended or adjusted under 35 U.S.C. 154(b) by 408 days.

(21) Appl. No.: 13/606,954

(22) Filed: Sep. 7, 2012

(65) Prior Publication Data

US 2014/0075535 A1    Mar. 13, 2014

(51) Int. Cl.
G06F 9/00 (2006.01)
H04L 29/06 (2006.01)
G06F 15/16 (2006.01)

(52) U.S. Cl.
CPC ........ H04L 65/605 (2013.01); H04L 63/0227 (2013.01)

(58) Field of Classification Search
CPC ........... H04L 29/06027; H04L 63/0227; H04L 65/605; H04Q 3/0062
USPC ......... 726/13, 12, 14, 23; 709/204, 231, 232
See application file for complete search history.

(56) References Cited

U.S. PATENT DOCUMENTS

| | | | |
|---|---|---|---|
| 6,359,656 B1 * | 3/2002 | Huckins | H04N 5/04 348/423.1 |
| 7,047,561 B1 * | 5/2006 | Lee | H04L 29/12009 726/12 |
| 7,391,808 B1 * | 6/2008 | Farrand | H04N 21/440218 375/240.02 |
| 8,339,959 B1 * | 12/2012 | Moisand et al. | 370/235 |
| 9,021,134 B1 * | 4/2015 | Patel | H04L 67/2823 709/246 |
| 2002/0164018 A1 | 11/2002 | Wee et al. | |
| 2004/0114612 A1 * | 6/2004 | Even et al. | 370/401 |
| 2004/0161040 A1 * | 8/2004 | Schreiber | H04H 60/04 375/242 |
| 2005/0091396 A1 * | 4/2005 | Nilakantan | H04L 45/04 709/232 |
| 2005/0283536 A1 * | 12/2005 | Swanson | G06Q 10/10 709/232 |
| 2006/0280195 A1 * | 12/2006 | Lopez, Jr. | H04L 41/24 370/419 |

(Continued)

OTHER PUBLICATIONS

"Streaming Video and Firewalls. Is It Safe?" http://www.vbrick.com/documentation/WhitePapers/Streaming_Video_and_Firewalls.pdf, Jun. 2011.

(Continued)

*Primary Examiner* — Gary S Gracia
(74) *Attorney, Agent, or Firm* — Browdy and Neimark, PLLC

(57) ABSTRACT

A streaming video security device is provided that comprises an input LAN interface, at least one streaming video decoder, an output LAN interface, at least one streaming video encoder coupled at one side to said LAN interface for streaming video output and coupled at the other side to a raw video display-compatible output interface; and unidirectional data flow element coupled at the transmitting side to the streaming video decoder through the raw video display-compatible output interface and coupled at the receiving side to one or more video encoder through the raw video display-compatible input interface.

26 Claims, 8 Drawing Sheets

(56) References Cited

U.S. PATENT DOCUMENTS

| | | | |
|---|---|---|---|
| 2007/0013702 A1* | 1/2007 | Hiroi | G06T 1/20 345/502 |
| 2007/0285500 A1* | 12/2007 | Ma | H04N 7/152 348/14.07 |
| 2008/0092007 A1* | 4/2008 | Takach | G06F 11/1443 714/748 |
| 2009/0055934 A1* | 2/2009 | Jauer | G06F 21/52 726/26 |
| 2009/0147795 A1* | 6/2009 | Mevissen | H04L 29/06 370/401 |
| 2010/0257353 A1* | 10/2010 | Cheng | H04L 63/105 713/153 |
| 2011/0069750 A1* | 3/2011 | Chengalvala | H04N 19/42 375/240.02 |
| 2011/0145431 A1* | 6/2011 | Momchilov | H04L 65/4084 709/231 |
| 2011/0145451 A1* | 6/2011 | Soffer | G06F 3/023 710/64 |
| 2011/0169913 A1* | 7/2011 | Karaoguz | G06F 3/14 348/42 |
| 2012/0131189 A1* | 5/2012 | Smart | G06F 21/64 709/225 |
| 2012/0185636 A1* | 7/2012 | Leon et al. | 711/102 |
| 2013/0139246 A1* | 5/2013 | Tryc et al. | 726/13 |
| 2014/0075535 A1* | 3/2014 | Soffer | H04L 65/605 726/13 |

OTHER PUBLICATIONS

European Search Report for European Parallel Patent application No. EP13183215 dated Oct. 5, 2017.

\* cited by examiner

METHOD AND APPARATUS FOR STREAMING VIDEO SECURITY

FIELD OF THE INVENTION

The present invention relates to a method, system and apparatus that secure computer networks from attacks that abuses incoming or outgoing streaming video, and more particularly a method and apparatus that act as network isolator and firewall for streaming video, remote sensing and multimedia applications.

BACKGROUND OF THE INVENTION

Streaming video is in wide use by many individual computer users and many organizations. Streaming video is used for various applications today—from entertainment, to video conferencing, on-line events, training, industrial control, remote sensing and security camera feeds. The use of streaming video in modern organizations causes major information security concerns as video is delivered over IP traffic and IP traffic may contain malicious code. Such malicious code inserted into incoming traffic may infect internal organization networks with viruses and Trojans. Code inserted into outbound video traffic may be used to leak classified information to interested parties outside the organization. To reduce the risks involved with inbound streaming video traffic most organizations are using firewalls with preprogrammed set of policies to handle video traffic.

Prior-art firewalls are typically not suitable or not optimized for streaming video traffic. There are several inherent difficulties and disadvantages involved with prior-art firewalls used to secure streaming video:

1. Streaming video in many applications requires low latency while flooding the network with intensive stream of traffic.
2. Prior-art firewalls cannot assemble the video images from the stream and therefore cannot secure the stream from video inserted code.
3. Prior-art firewalls must be powerful, big and expensive to handle multiple streams at the same time.
4. Prior-art firewalls performing deep packet inspection in parallel silicon engines tends to create visual artifacts in the output stream.

In many cases due to the intensive QOS (Quality Of Service) requirements of video conferencing and streaming video, many organizations separate these streams by set of rules and bypasses deep security analysis.

U.S. Pat. No. 7,047,561; to Lee; titled "Firewall for real-time internet applications"; discloses a firewall for use in association with real-time Internet applications such as Voice over Internet Protocol (VoIP). The firewall applies an application proxy to the signaling and control channels and a packet filter to the bearer channels.

United States Patent Application 20050283536; to Swanson, Jon N.; et al; titled "Real time streaming data communications through a security device"; discloses a method of for connecting a plurality of clients to one another over a computer network for communication of real-time streaming data to one another, with at least one of the clients being separated by a security device from the network.

The white paper: "Streaming Video and Firewalls. Is It Safe?", which may be found in http://www.vbrick.com/documentation/WhitePapers/Streaming_Video_and_Firewalls.pdf details some of the risks and difficulties involving video streaming.

SUMMARY OF THE EMBODIMENTS

In view of the security risks associated with streaming video connected to secure networks, and in view of the shortcoming of prior art network firewalls, there is a need for a streaming video security device that will satisfy at least some of the following requirements:

1. Provide efficient and low-latency packet inspection and packet filtering. In an exemplary embodiment, this function is performed by the two firewall blocks inside the device. These blocks are responsible for:
   a. Providing packet filtering (OSI layers 1-4) based on predefined policy or rules.
   b. Handling layer 4 (transport layer) and thus function as transport layer filter. Note that this function requires buffering of incoming packets and thus adds latency to the process and therefore can be disabled if low latency is critical for the application.
   c. It provides some basic application layer filtering—only functions relevant to multimedia streams and command control packets]
2. Provide efficient protection from non-video traffic passed through video sessions;
3. Provides efficient protection form malicious code inserted into video frames;
4. Passes meta-data while providing an efficient protection from attacks abusing this channel;
5. Will be Low power, low cost, small size;
6. Provide secure a forward path for video related data such as sensors information; and
7. Provide a secure backwards path for data such as sensor commands.
8. Provide galvanic network isolation between incoming and internal networks.

Therefore, it is provided in accordance with a preferred embodiment of the present invention a streaming video security device comprising:

an input LAN interface capable of receiving streaming video input;

at least one streaming video decoder coupled at one side to said input LAN interface for streaming video input and coupled at the other side to a raw video display-compatible output;

an output LAN interface capable of transmitting streaming video output;

at least one streaming video encoder coupled at one side to said LAN interface for streaming video output and coupled at the other side to a raw video display-compatible output interface; and unidirectional data flow element coupled at the transmitting side to said at least one streaming video decoder through said raw video display-compatible output interface and coupled at the receiving side to one or more video encoder through said raw video display-compatible input interface.

Furthermore, in accordance with another preferred embodiment of the present invention, said raw video display-compatible input and output are selected from a group consisting of: ITU-R BT.656, VGA, DVI, HDMI, and LCD interface.

Furthermore, in accordance with another preferred embodiment of the present invention, the device further comprising:

an input firewall function connected between said input LAN interface for streaming video input and said at least one streaming video encoder; and an output firewall function connected between said output LAN interface for streaming video output and said at least one streaming video decoder;

wherein said input firewall function is capable of:

sorting out non video packets from a stream of packets arriving from said input LAN interface;

analyzing said non video packets and rejecting unsafe packets; and transferring only safe non video packets to said output firewall function, and wherein said output firewall function is capable of:

sorting out non video packets from a stream of packets arriving from said output LAN interface;

analyzing said non video packets and rejecting unsafe packets; and transferring only safe non video packets to said input firewall function, Furthermore, in accordance with another preferred embodiment of the present invention, the device further comprising at least one data filter function connected between said input firewall function and said output firewall function, said data filter is capable of passing only predefined traffic based on programmed rules.

Furthermore, in accordance with another preferred embodiment of the present invention, the device further comprising at least one data diode connected in series with said at least one data filter, wherein said data diode is capable of enforcing data flow only in one direction.

Furthermore, in accordance with another preferred embodiment of the present invention, the device further comprising a decryption function connected between said input LAN interface and said at least one streaming video encoder, wherein said decryption function is capable of decrypting incoming encrypted streaming video input.

Furthermore, in accordance with another preferred embodiment of the present invention, the device further comprising an output encryption/decryption function connected between said at least one streaming video decoder and said output LAN interface for streaming video output, and wherein said encryption/decryption function is capable of at least encrypting the streaming video output.

Furthermore, in accordance with another preferred embodiment of the present invention, the device further comprising an auxiliary display interface coupled to said raw video display-compatible output to enable connection of a local display.

Furthermore, in accordance with another preferred embodiment of the present invention, the device further comprising meta-data filter capable of filtering the video embedded meta-data based on preprogrammed criterions and passing said video embedded meta-data between said at least one streaming video decoder and said at least one streaming video encoder.

Furthermore, in accordance with another preferred embodiment of the present invention, the device further comprising at least one data diode connected in series with said at least one data filter, wherein said data diode is capable of enforcing data flow only in one direction.

Furthermore, in accordance with another preferred embodiment of the present invention, the device further comprising a galvanic isolator, capable of providing galvanic isolation between said input LAN interface for streaming video input and said output LAN interface for streaming video output, wherein said galvanic isolator is selected from a group consisting of: optical isolators, transformers, Radio Frequency isolators and differential signal pairs.

Furthermore, in accordance with another preferred embodiment of the present invention, the device further comprising a management function capable of providing at least one service selected from a group consisting of: diagnostics, settings, monitoring, security keys loading, asset management and alarms.

Furthermore, in accordance with another preferred embodiment of the present invention, said management function is an out-of-band management connected to a management LAN via a separate LAN interface.

Furthermore, in accordance with another preferred embodiment of the present invention, the device further comprising a log function having a non-volatile memory capable of capturing, storing and reporting normal or abnormal device events based on predefined criterions.

Furthermore, in accordance with another preferred embodiment of the present invention, the device further comprising:

at least one intrusion sensor capable of sensing mechanical intrusion attempt to the internal circuitry of the streaming video security device; and an anti-tampering circuitry coupled to said at least one intrusion sensor, wherein said anti-tampering circuitry is configured to permanently disable at least one of the functions of the streaming video security device as a result of sensing the intrusion attempt.

Furthermore, in accordance with another preferred embodiment of the present invention, said anti-tampering circuitry further comprises an independent power source selected from a group consisting of: a battery, and a super-capacitor.

Furthermore, in accordance with another preferred embodiment of the present invention, said unidirectional data flow element further comprises a video transmitter and a video receiver pair, wherein said video transmitter is coupled to said at least one streaming video decoder and said at least one streaming video receiver is coupled to said at least one streaming video encoder, and wherein said video transmitter and said video receiver are linked together.

Furthermore, in accordance with another preferred embodiment of the present invention, the device further comprising at least one unidirectional data flow element coupled at the transmitting side to said at least one streaming video decoder through raw audio output interface and coupled at the receiving side to said at least one streaming video encoder through raw audio input interface to securely pass one or more audio channels.

Furthermore, in accordance with another preferred embodiment of the present invention, the device is having a modular blade form-factor, capable of being inserted into a modular blade chassis.

Furthermore, in accordance with another preferred embodiment of the present invention, at least one of said at least one streaming video decoder and said at least one streaming video encoder further capable of detecting abnormal incoming video frames behavior based on predefined rules, wherein upon detection of an abnormal traffic, it discards that traffic and does not pass it to the device output.

It is optionally provided yet another preferred embodiment of the present invention: a secure video streaming system comprising:

at least a first secured network;

at least a first unsecured network; and at least a first streaming video security device, connected between said at least first secured network and said at least first unsecured network, said first streaming video security device comprising:

an input LAN interface capable of receiving streaming video input;

at least one streaming video decoder coupled at one side to said input LAN interface for streaming video input and coupled at the other side to a raw video display-compatible output;

an output LAN interface capable of transmitting streaming video output;

at least one streaming video encoder coupled at one side to said LAN interface for streaming video output and coupled at the other side to a raw video display-compatible output interface; and unidirectional data flow element coupled at the transmitting side to said at least one streaming video decoder through said raw video display-compatible output interface and coupled at the receiving side to one or more video encoder through said raw video display-compatible input interface.

Furthermore, in accordance with another preferred embodiment of the present invention, the system further comprising:

a second secured network;

a second unsecured network;

a second streaming video security device, connected between said second unsecured network and said second secured network; and a blade chassis, wherein said first a second streaming video security device and said second a second streaming video security device are having blade form-factor and are capable of being inserted into said blade chassis.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Unless marked as background or art, any information disclosed herein may be viewed as being part of the current invention or its embodiments.

BRIEF DESCRIPTION OF THE OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE DRAWINGS

Figure 1:
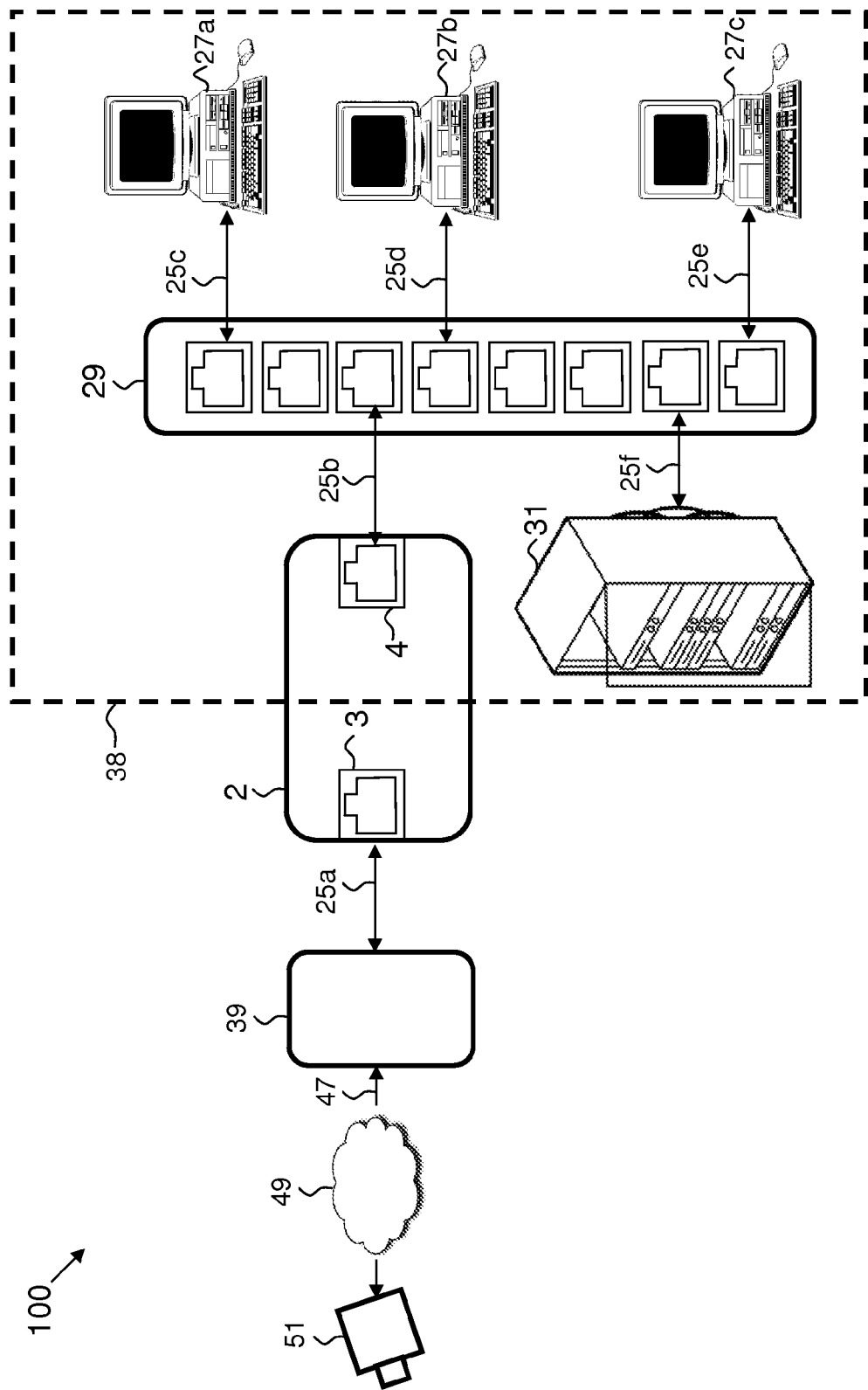
FIG. 1 illustrates a simplified drawing of a typical prior-art video streaming system using a prior art network firewall device for security.

Before explaining at least one embodiment of the invention in detail, it is to be understood that the invention is not necessarily limited in its application to the details set forth in the following description or exemplified by the examples. The invention is capable of other embodiments or of being practiced or carried out in various ways.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The letter "x" after an element number may stand to any letter such as "a", "b", etc. The drawings are generally not to scale. For clarity, non-essential elements may have been omitted from some of the drawing.

To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, or the like) or multiple pieces of hardware. Similarly, the programs may be stand alone programs, may be incorporated as subroutines in an operating system, may be functions in an installed software package, and the like.

FIG. 1 illustrates a block diagram 100 presenting a prior art remote streaming video system having conventional network firewall device 2 to provide security to classified network 38. Video source 51 is video camera, conference phone, thermal imager sensor, radar sensor, video encoder or any other remote sensor capable of generating video over IP stream. In this system, video stream IP traffic 47 is passed through unsecure public networks 49 such as internet or wireless network. At the user's site, a router or modem 39 connected to the IP stream 47, passes the IP traffic through LAN (Local Area Network) cable 25a to the network firewall 2 LAN input port 3. Network firewall device 2 applies a per-programmed set of rules and policies and blocks incoming and outgoing packets of data that do not comply with these rules. Classified network subsystem 38 is coupled to the network firewall device 2 through output LAN port 4, LAN cable 25b and LAN switch 29. LAN switch 29 is coupled to the secure network user devices computers 27a, 27b and 27c through LAN cables 25c, 25d, and 25e respectively and to server/storage rack 31 through LAN cable 25f. The use of prior-art firewall device 2 to secure the classified network 38 may impose the following risks:

1. Limited video bandwidth;
2. Quality of Service issues that causes video artifacts;
3. Video latency issues;
4. Advanced malicious code may be passed through the streaming video from the un-trusted video source 51 or from the unsecure public network 49; and
5. Classified information residing on user computers 27x or on centralized storage or servers 31 may be leaked to external attackers through the streaming video traffic passed through the prior-art firewall device 2.

Figure 2:
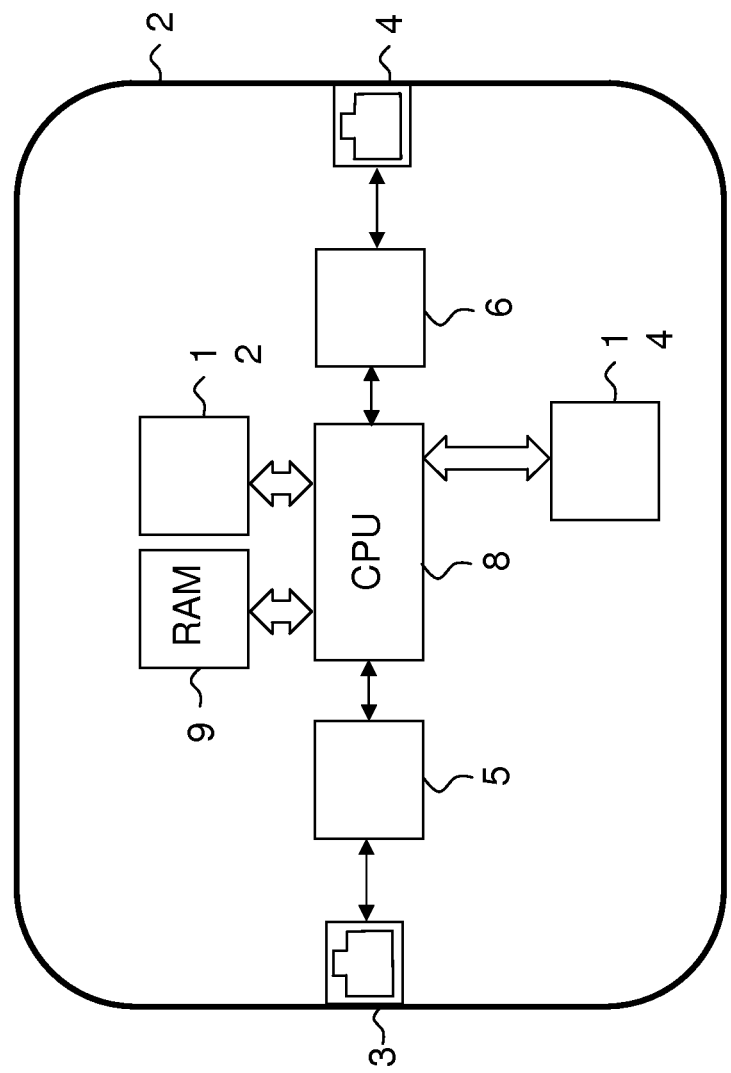
FIG. 2 illustrates a simplified drawing of a typical prior-art network firewall device used for streaming video security.

FIG. 2 illustrates a block diagram 200 presenting a prior art conventional network firewall device 2 used for remote streaming video applications such as the system 100 shown in FIG. 1 above. This firewall 2 may be designed based on conventional x86 server or PC machine or may be an appliance that that is based on RISC architecture CPUs such as ARM or based on large array of microprocessors such as Tiles or GPGPU (General Purpose Graphical Processing Units). In all cases the block diagram is similar. A firewall is a device or set of devices designed to permit or deny network transmissions based on a set of rules and is frequently used to protect networks from unauthorized access while permitting legitimate communications to pass. The firewall 2 has input LAN (Local Access Network) port 3. Input LAN port 3 is coupled to the streaming video source in this prior-art embodiment example. Input LAN port 3 may be 10/100 Ethernet, Giga Ethernet, 10 Giga Ethernet, Optical fiber interface or any other type of network port capable of delivering digitized video traffic.

Input LAN port 3 is coupled to one or more CPU 8 through Input LAN interface function 5. One or more CPU 8 may be x86 CISC (complex instruction set computer) type or RISC (reduced instruction set computer) type processors such as MIPS (Microprocessor without Interlocked Pipeline Stages) or ARM cores. Input LAN Interface function 5 may be PCI (Peripheral Component Interconnect) interface, LOM (LAN-on-Motherboard), MAC (Media Access Control), PHY (LAN Physical Layer), SERDES (Serializer/Deserializer) or any other required circuitry to interface the Input LAN port 3 with one or more CPU 8.

One or more CPU 8 is coupled to a Volatile Memory 9 such as RAM (Random Access Memory) or SRAM (Static RAM) to temporarily store programs and data. One or more CPU 8 is also coupled to a Non-volatile Memory 12 where program files and operational settings are stored. Non-volatile Memory 12 may be hard-disk, flash storage device or any other suitable storage device.

One or more CPU 8 is further coupled to an optional Network Processing hardware accelerator circuitry 14 that is designed to perform specific packet operations such as Deep Packet Inspection or encryption/decryption operations.

One or more CPU 8 is also coupled to the output LAN port 4 through LAN interface function 6 to enable connection of the filtered video stream traffic to the target networks. Output LAN port 4 may be 10/100 Ethernet, Giga Ethernet, 10 Giga Ethernet, Optical fiber interface or any other type of network port.

LAN port 4 is coupled to one or more CPU 8 directly or through LAN interface function 6 similar to LAN interface function 5 described above.

It should be noted that some of the functions described above may be implemented on a single-chip die to reduce the cost and size of the product.

This prior-art firewall is typically lacking the efficiency and the security level required for certain applications.

In order to effectively detect complex malicious code injected into the incoming video stream, firewall device 2 must perform extensive scale of operations on each packet or set of packets and on each video frame. This need for extensive scale of operations tends to:

1. Limit the amount of traffic that can pass through the firewall device 2.
2. Limit the depth of analysis done on incoming traffic and hence reduces the level of security provided by the firewall device 2.
3. Increase the latency of traffic passing through firewall device 2. This may negatively impact certain uses of the video traffic. For example, this may reduces the performance of real time video applications such as video conferencing.
4. Increase the performance requirements of the firewall device 2 and hence increase its cost.
5. Increase the power requirements and heat dissipation of the firewall device 2.

It should be noted that most prior-art firewall devices are not optimized for video traffic and therefore cannot provide the required depth of analysis on each video frame and sequence of frames. In fact some prior-art firewalls are not capable of reconstructing the video frames at all and therefore are limited to packet related threats. Prior-art network firewalls also suffer from the disadvantage that it cannot guarantee unidirectional data flow. Such outbound traffic may be used to leak classified information to interested parties outside the organization.

In certain applications there is also a need to add a network galvanic isolator before the input network port 3 as prior-art firewalls are not electrically isolating.

Figure 3:
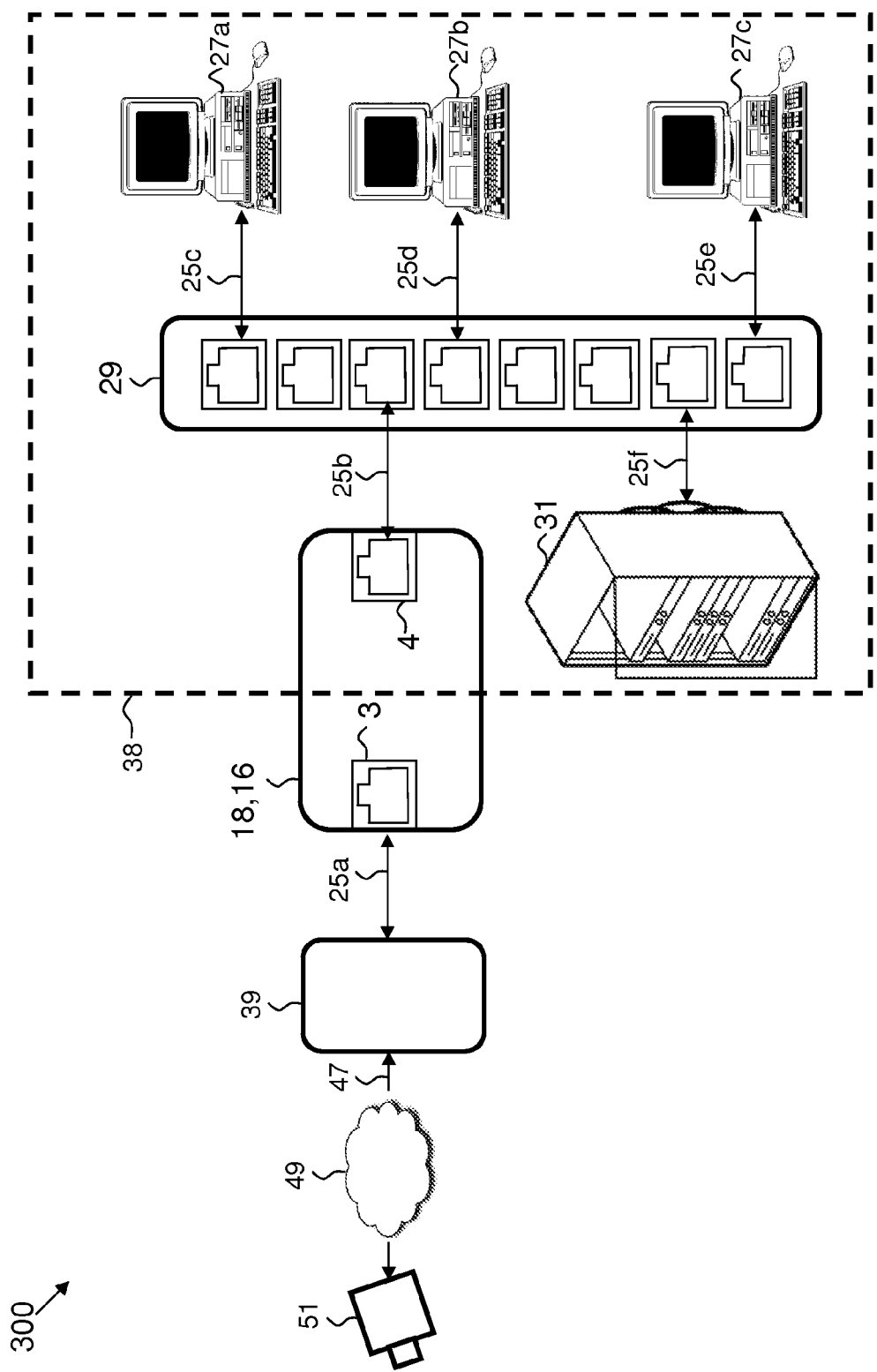
FIG. 3 illustrates a high-level block-diagram of an exemplary embodiment of the present invention of a video streaming system using an inventive network firewall device for security.

FIG. 3 illustrates a block diagram 300 presenting a remote streaming video system having an exemplary device 16 or 18 of the current invention to provide security to classified network 38. This system 300 is similar to the system 100 of FIG. 1 above but instead of the prior-art firewall device 2, an inventive streaming video security device 16 or 18 according to an exemplary embodiment of the current invention is used to secure the streaming video traffic. Some details of streaming video security device 16 or 18 may be seen in FIGS. 4 and 5 respectively.

Streaming video security device 18 is coupled to the unsecure network 49 at one side (via router or modem 39) and to the classified network 38 on the other side to secure the classified network 38.

In this system the streaming video security device 18 provides the following functions:

1. Passing incoming streaming video traffic without delays or artifacts;
2. Preventing malicious code from entering the classified network 38 through incoming video traffic 47;
3. Minimizing the risks of Denial of Service attack from the internet 49 on the classified network 38 computers 27x, server and storage resources 31; and
4. Preventing classified network 38 data leakages to the unsecured network (such as the internet) 49.

Figure 4:
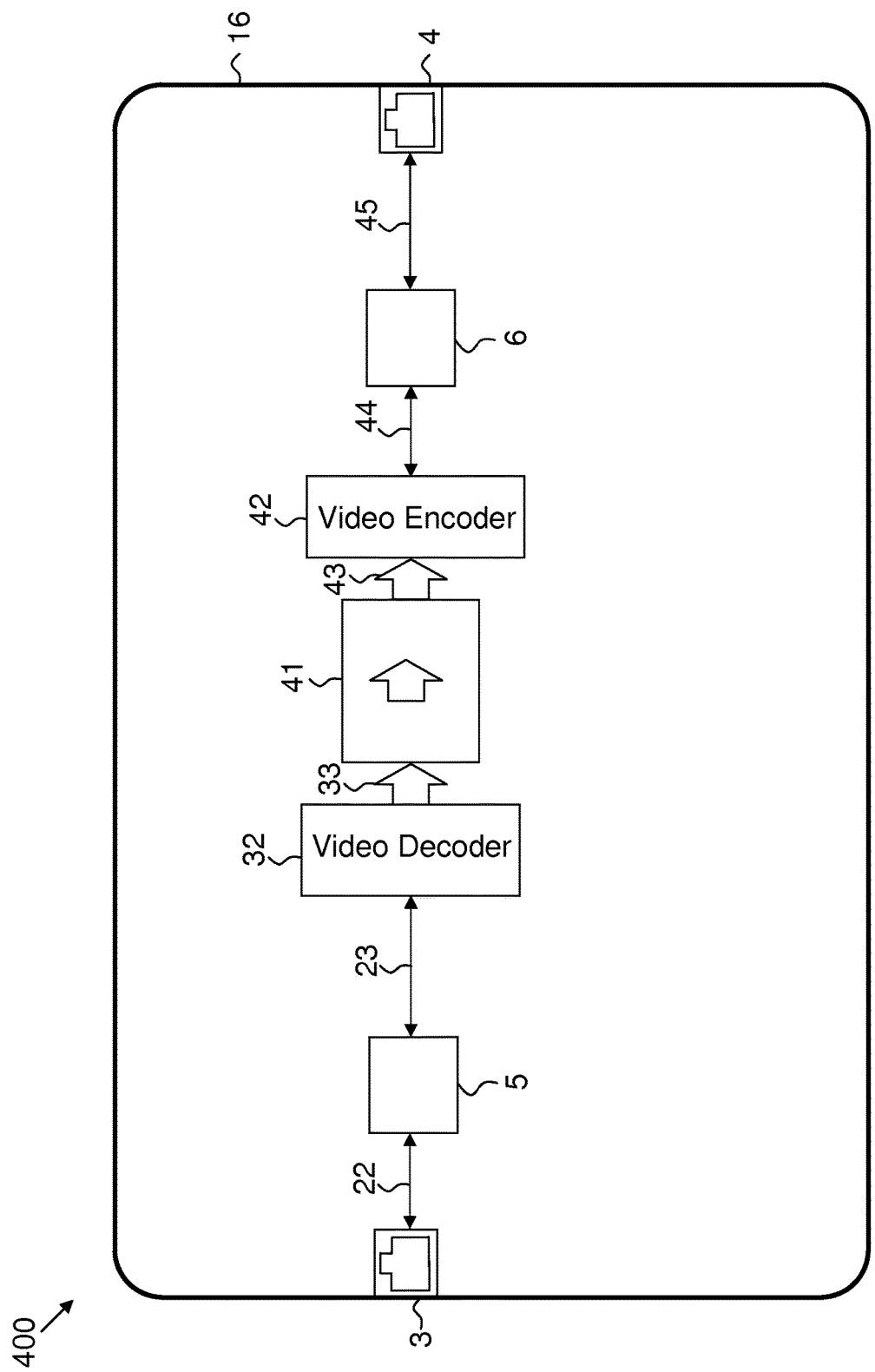
FIG. 4 illustrates a high-level block-diagram of an exemplary embodiment of the present invention having video decoder and encoder coupled together through unidirectional flow enforcing function.

FIG. 4 illustrates a high-level block-diagram 400 of a streaming video security device 16 according to an exemplary embodiment of the current invention.

Streaming video security device 16 receives incoming streaming video traffic through input LAN port 3. Input LAN port 3 may be 10/100 Ethernet, Giga Ethernet, 10 Giga Ethernet, Optical fiber interface or any other type of network port capable of delivering digitized video stream.

Input LAN port 3 is coupled through input LAN interface function 5 to video encoder function 32 through lines 22 and 23. It should be noted that many Video Encoder chips available today have an integrated LAN interface function. Some chips also contain a LAN Physical Layer while other requires external Physical Layer interface chip.

Video Encoder function converts the incoming video streaming packets into a raw video format 33. This raw video display-compatible output stream 33 is typically implemented as ITU-R BT.656, VGA (Video Graphics Array), DVI (Digital Visual Interface), HDMI (High-Definition Multimedia Interface) or DisplayPort video output.

Raw video display-compatible output stream 33 is coupled to unidirectional flow enforcing function 41 that assure unidirectional flow of data as indicated by the arrow in the figure. The unidirectional flow enforcing function 41 provides raw video display-compatible output 43 which is coupled to the Video Encoder function 42, where it is digitized and compressed to form the video over IP output 44 that is coupled through lines 44, output LAN interface function 6 and through lines 45 to the LAN output 4. It should be noted that many Video Decoder chips available today have an integrated LAN interface function. Some chips also contain a LAN Physical Layer while other requires external Physical Layer interface chip.

It also should be noted that some video CODEC chips are capable of performing video decoding and video encoding simultaneously and independently and if such chip is used then the video decoder function output is coupled to the video encoder input through unidirectional flow enforcing function 41.

Figure 5:
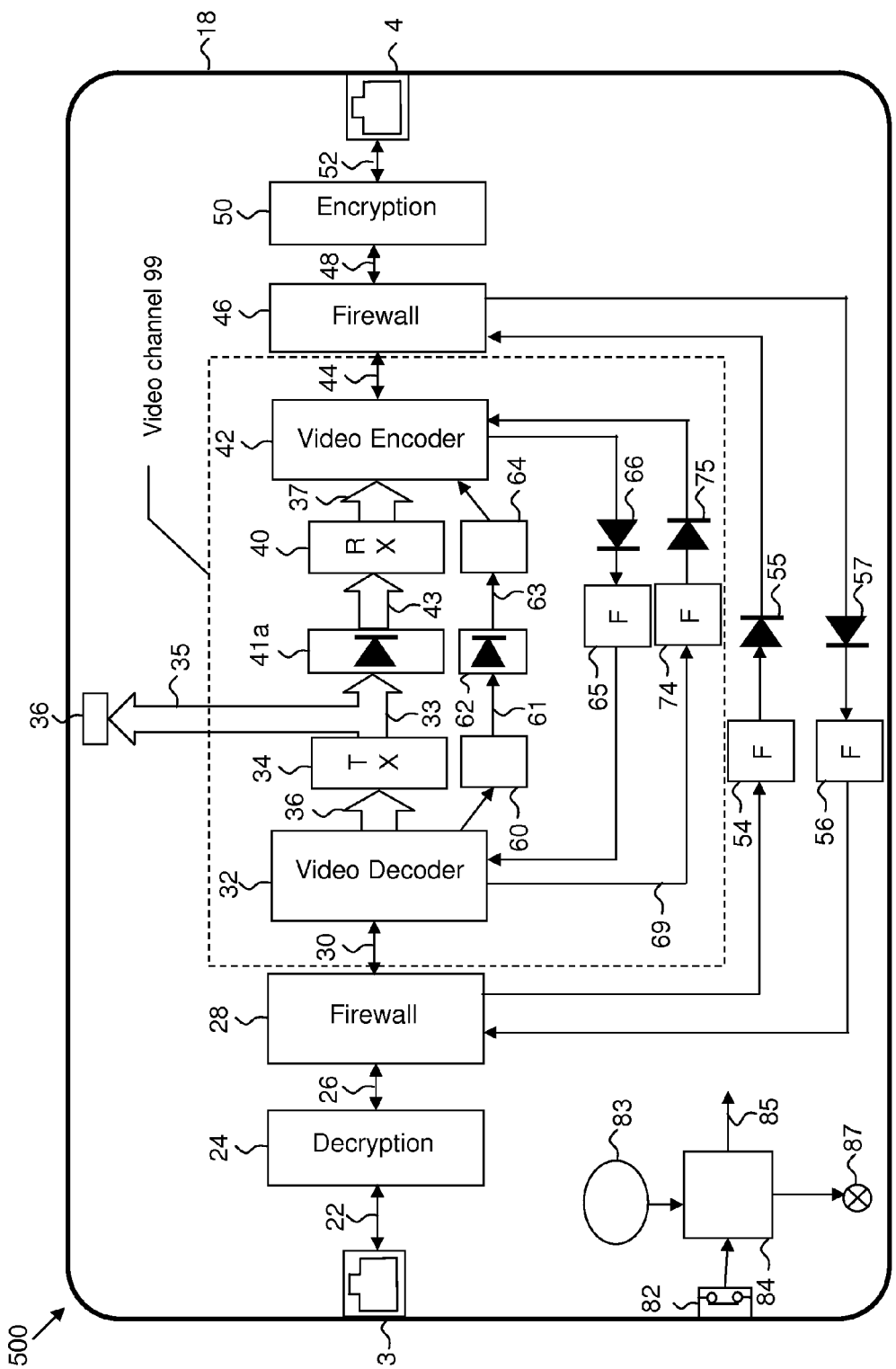
FIG. 5 illustrates a high-level block-diagram of another exemplary embodiment of the present invention having additional operational and security functions such as decryption-encryption and input and output firewalls.

Audio output may be embedded inside the raw video display-compatible output 44 (for example in HDMI format) or passed through dedicated digital or analog outputs as seen in FIG. 5 below.

Video Decoder function 32 and Video Encoder function 42 may have additional internal or external functions such as non-volatile memory to store the decoder/encoder firmware and volatile memory to temporarily store decoder/encoder data and parameters. These internal functions are not shown in FIG. 4 to prevent cluttering.

It should be noted that the unidirectional flow enforcing function 41 may be an integral component of the Video Decoder function 32, Video Encoder function 42 or both.

In other implementations of the current invention the unidirectional flow enforcing function 41 also provides galvanic isolation between the input and the output sections of the device. This galvanic isolation requires internal isolated power supply (not shown here).

Video Encoder function 42 may be designed and programmed to generate any required streaming video protocol similar to streaming video input or different as required for specific application (such as format converter, transcoding, transrating function).

For example the embodiment of the current invention may be programmed to support one or more of the following input-output protocol operating modes:

1. Protocol Transparent Mode—the same input video protocol received by Video Decoder function 32 is generated by Video Encoder function 42.
2. Protocol Independent Mode—input video protocol received by Video Decoder function 32 may vary. Output video protocol generated by Video Encoder function 42 is fixed through predefined settings.
3. Static Protocols Mode—Both input video protocol received by Video Decoder function 32 and output video protocol generated by Video Encoder function 42 are fixed through predefined settings (may be same or may be different as needed).

To enable the transfer of information about the input video protocol to be communicated between the Video Decoder function and the Video encoder function, additional unidirectional channel may be added as shown in FIG. 5 below in items 69, 74 and 75.

This relatively simple and low-cost exemplary embodiment of the current invention combines extensive security capabilities with low power consumption and small size and reduce cost compared to prior-art devices.

The conversion to raw video protocol and the back conversion into streaming video over IP traffic assure that only displayable data is passing through. All other injected data or malicious code would not pass such double conversion. This exemplary embodiment of the current invention may run additional code in the Video Decoder 32 or Video Encoder 42 firmware to detect abnormal video frames based on predefined criterions.

For example Video Decoder 32 may check average contrast changes in each frame. A rapid deviation of more than a predefined percentage from the average value may indicate bar-code image or attempt to inject abnormal image. Such attempt may be detected by the Video Decoder 32 and the suspicious frames will be deleted. The signal representing these abnormal frames is not passed to the raw video display-compatible signals 33 and therefore not passed to the output LAN port 4 in video over IP form. Other more detailed criterions may be applied to prevent potential attacks through abnormal video images. For example:

1. Rapid changes in the brightness or luminance or colors at the same frame;
2. Rapid changes in the brightness or luminance or colors at different frames;
3. Detection of black-white symbols or characters;
4. Detection of dark frames (no video images); and
5. Detection of motion freeze frames.

FIG. 5 illustrates a high-level block-diagram 500 of another streaming video security device 18 according to an exemplary embodiment of the current invention. Streaming video security device 18 is similar to the device 16 of FIG. 4 above but comprising of additional functions to further enhance the device functionality and security as explained below. For drawing clarity, Input LAN interface function 5 and output LAN interface function 6 are not seen in this and the following figures.

In this embodiment of the current invention the input LAN port 3 is coupled to an optional Input Encryption/Decryption function 24 that is used to encrypt and decrypt incoming traffic using predefined algorithms such as standard AES-256, ECC (Elliptic Curve Cryptographic) or modified/non-standard decryption algorithm. Bi-directional traffic encryption/decryptions is primarily used to establish normal communication with the video decoder function 32. The resulted plain-text IP traffic input/output 26 is coupled to the Input Firewall function 28 data input. Input Firewall function 28 uses a set of predefined rules and algorithms to filter incoming traffic and drop abnormal packets. For example, the firewall 28 may use standard OSI layers 1-3 rules to discard packets that not compatible with the criterions—of example incorrect port numbers, IP MAC, etc; it may also applies layer 4 rules for connection state if required. The output of this firewall connected to the video decoder 32 that essentially has 2 ports—one for the video connection and the other one for management and configuration. It may also be programmed to respond to a flood or Denial Of Service attacks. The Input Firewall function 28 data output 30 is typically a LAN or some internal bidirectional data bus.

In contrast to some firewall devices of the art, devices streaming video security devices 16 and 18 are asymmetric in the sense that video streaming is handled only in the direction from Input LAN port 3 to output LAN port 4, but not in the other direction. In the embodiments depicted in FIGS. 3, 6 and 8, video data flows only from the video sources 51*x*. Thus, asymmetric streaming video security devices suffice. This situation may be true for other applications, where video data from other sources (e,g, remote servers) is viewed by users at computer 27*x*. In these situations, no video streaming is required in the direction from output LAN port 4 to Input LAN port 3, and the cost of implementing symmetric video streaming may be avoided. Additionally, the absence of video streaming capability in the return path may be advantageous as it further inhibits data leak (in form of video streaming) to the unsecure network.

It should be noted here that a symmetric firewall structure similar to the exemplary embodiment of the current inventions shown here may be needed for supporting both streaming video input to the classified organization and streaming video output from the classified organization (e.g. for video conferencing, etc.). It should be apparent to the man skilled in the art that streaming video security devices 16 and 18 may be adapted to symmetric video streaming operation by duplication of the video streaming path in reverse direction. For example, we may define a video channel 99 as the elements in the dashed box marked in FIG. 5. Connecting an additional similar but mirror-image (inverted left-to-right) video channel between firewalls 28 and 46 would create a symmetric streaming video security device.

The Input Firewall function 28 data output 30 is coupled to the Video Decoder function 32 data input where video over IP is converted into internal raw video bus 36 such as 24 bit RGB (Red Green Blue) LCD (Liquid Crystal Display) bus. Internal video output bus 36 is converted through video transmitter function 34 into raw video display-compatible output 33 such as ITU-R BT.656, VGA, DVI, HDMI or DisplayPort signals.

Video Decoder function 32 may have additional internal or external functions such as non-volatile memory to store the decoder firmware and volatile memory to temporarily store decoder data and parameters. These internal functions are not shown in FIG. 5 to prevent cluttering.

It should be noted that display Plug and Play or EDID (Extended display identification data) handshaking is preferably disconnected or not implemented in the raw video display-compatible output 33 to prevent data leakages from the Video Decoder function 32.

Optionally, raw video display-compatible output signals 33 are passed through lines 35 into the optional auxiliary local display port 96. The optional auxiliary local display port 96 enables connection of local user display to view streaming video locally.

Raw video display-compatible output signals 33 are coupled to the Unidirectional video data flow enforcing function 41.

Unidirectional video data flow enforcing function 41 enforces the flow of the raw video display-compatible output 33 in one direction only—from the Video Decoder function 32 through the video transmitter 34 to the Video Encoder function 42 through the video receiver 40. Video receiver 40 receives the raw video display-compatible output 43 from the Unidirectional video data flow enforcing function 41*a* and converts it back into raw video stream 37 that is similar to raw video stream 36 or different as required for specific application (such as format converter, transcoding, transrating function). Raw video stream 37 is coupled to the video input of Video Encoder function 42.

The Video Encoder function 42 receives the raw video stream 37 and converts it back to digitized video over IP format such as H.264 or similar.

It should be noted that the Unidirectional video data flow function 41 and video transmitter 34 and receiver 40 may be an integral component of the Video Decoder function 32, Video Encoder function 42 or both. Also some video transmitters 34 and receivers 40 has the inherent function of unidirectional data flow enforcement and therefore direct connection between the video transmitter 34 and video receiver 40 is possible.

Video Encoder function 42 converts the incoming video stream into compressed video over IP packets and passes the resulted streaming video through output lines 44 to the output firewall function 46. The output firewall function 46 is similar to the input firewall function 28 but is located at the device 18 data output path. This firewall function similar to the input side firewall 24: It prevents attempts to access resources from inside the network to the network outside. It handles the 1-3 layers discarding illegal packets or attempts to flood the device with packets. Both or any one of the sides may also keep logs and can report in real time through either the connected network or through a dedicated out-of-band management network (not shown here. For example management interface 72 seen in FIG. 7). It should be noted that output network cannot be fully trusted as infected computers at that network may attempt to transfer data to the outside world through the device 18.

The role of the output firewall function 46 is to protect the device 18 from attacks originated at the output network side (38 in FIG. 3 above).

The output 48 of output firewall function 46 is coupled to the output encryption/decryption function 50 where streaming video is optionally encrypted using predefined algorithm as described above in the input encryption/decryption function 24. Optional output encryption/decryption function 50 LAN output 52 is coupled to the device LAN output jack 4 to enable connection to the target network side. It should be noted here that the operation of the input encryption/decryption function 24 and the output encryption/decryption function 50 may be independent in some environments. It is possible for example that the incoming streaming video is encrypted but the outgoing streaming video is not or vise versa.

Audio signals may be embedded in the incoming streaming video data and therefore should be securely handled by device 18. Video Decoder function 32 may generate streaming audio output, for example I2C compatible signal, that is coupled to audio CODEC 60. Audio CODEC 60 converts the digitized audio stream into analog audio stream 61 (mono, stereo or multiple channels as needed). Analog audio stream 61 is passed through audio unidirectional flow enforcing function 62 and through analog audio output 63, it is coupled into another audio CODEC 64 where it is converted back into a digital data stream. This digital data stream is then coupled to the Video Encoder function 42 where it is compressed and digitized together with the video signals. It should be noted that this separate audio path may not be necessary if the video transmitted 34 and video receiver 40 is HDMI, DisplayPort or similar protocol that supports embedded audio signals.

In some embodiments of the current invention device 18 may further comprises a dedicated commands channel. This channel may be needed for applications such as camera control (pan, tilt, zoom etc.) or remote sensors operation. In some cases this data is passed through separate (non-video) packets that may be sorted by the output firewall function 46 and handled separately from the video stream. To reduce the security risks involved with such reverse data path, data diode 57 is connected between the output firewall function 46 and the input firewall function 28 to enforce only one-way traffic. Data filter 56 may be added to further filter returned commands based on predefined template or criterions (for example—a specific XML structure having specific commands and internal data or specific SNMP—Simple Network Management Protocol data).

In other embodiments of the current invention a forward data path may be needed as well in order to deliver non-video data such as sensors data, video source information such as date, time, location coordinates etc. or acknowledge for commands (for example distance to the target shown in the image). In some cases this data is passed through separate (non-video) packets that may be sorted by the input firewall function 28 and handled separately from the video stream. Such data cannot pass securely through the video path and therefore a dedicated forward data diode 55 passes this data between the input firewall function 28 and the output firewall function 46. Data filter 54 may be added to further filter the passing data based on predefined template or criterions (for example—a specific XML structure having specific commands and internal data or SNMP data).

In some exemplary embodiments of the present invention the streaming video is optionally further containing meta-data that must be securely handled by the device 18. As video meta-data cannot be easily diverted from the video traffic as described above, there is an additional meta-data path coupling the video decoder function 32 with the video encoder function 42 through programmable filter 65. This path may also comprise of a data diode 66 to enforce unidirectional data-flow. Programmable filter 65 may be configured to pass only specific types of data based on the current application.

In an embodiment of the present invention the streaming video security device 18 is optionally further equipped with another data path to enable forward data-flow of specific traffic 69 from Video Decoder function 32, through data filter 74 optional data diode 75 to the Video Encoder function. Such path may be used to enable coordination of Video Encoder protocols with Video Decoder or transfer of specific video meta-data.

In an embodiment of the present invention the streaming video security device 18 is optionally further equipped with active anti-tampering function 84. This function uses low power microcontroller or discrete components to sense mechanical intrusion attempt through sensor such as switch 82 that is mechanically coupled to the device enclosure. When switch 82 is interrupted, the anti-tampering function 84 senses this transition and triggers a chain of events through line 85 that cause at least one of the following effects:

a. Device is disabled permanently—it cannot be activated anymore.
   b. Input Encryption/Decryption function 24 is disabled, algorithm and keys are erased.
   c. Output Encryption/Decryption function 50 is disabled, algorithm and keys are erased.
   d. Input firewall function 28 is disabled—no incoming traffic is passing through.
   e. Output firewall function 46 is disabled—no outgoing traffic is passing through.
   f. Drives LED 87 to illuminate in red color to provide clear visual indication that the device was tampered.

During normal operation, the anti-tampering function 84 is powered by the device external supply power source (not shown in this figure).

Coin battery or super-capacitor 83 provides backup power for the anti-tampering function 84 and sensor 82 to enable detection even when the device is unpowered (for example during shipment). Addition means such as tamper evident labels may be used to provide visual indications of the tampering attempt.

It should be noted that the active anti-tampering function may be critical to assure that product was not tampered with modified or extra circuitry to provide a covert data channel with remote attacker.

Figure 7:
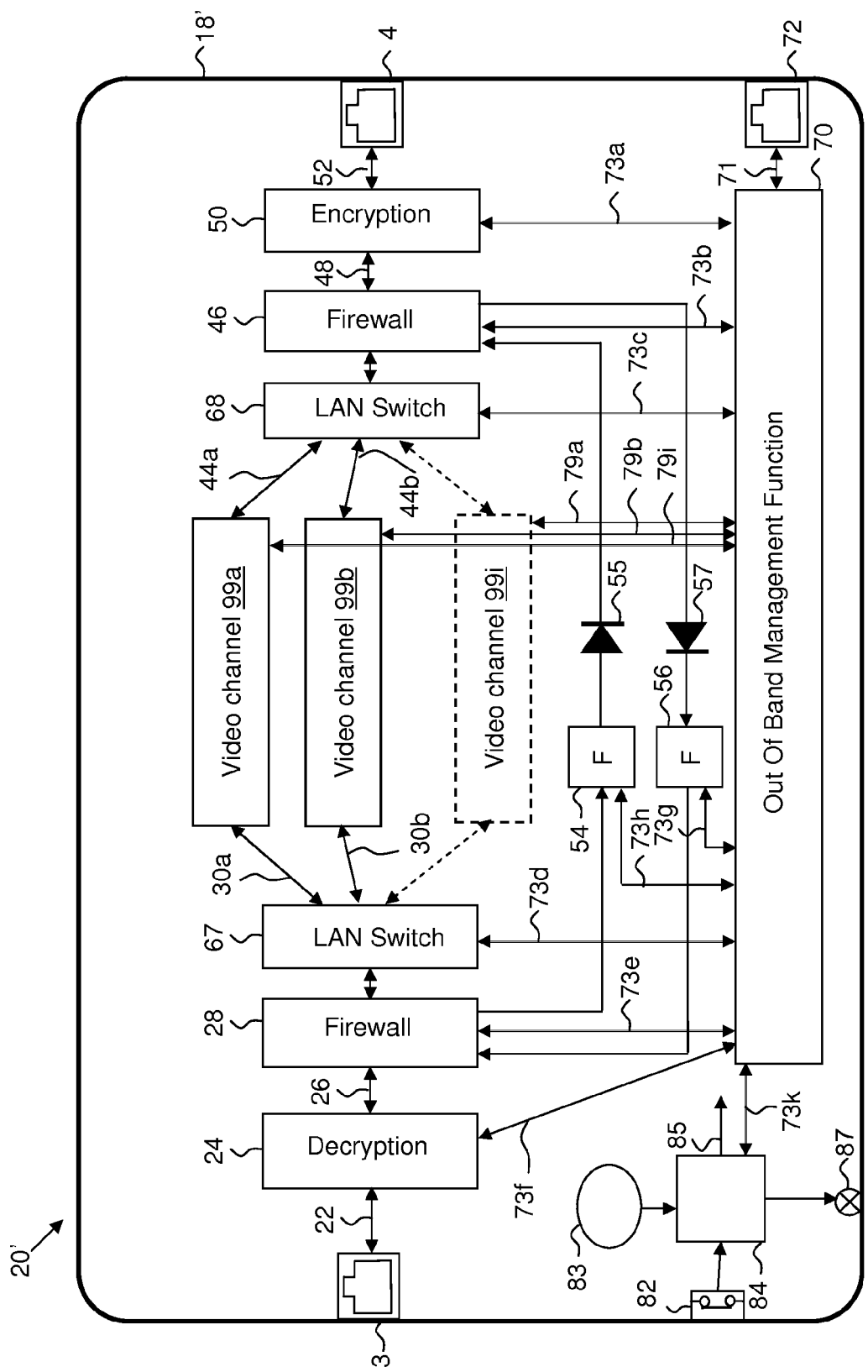
FIG. 7 illustrates a high-level block-diagram of another exemplary embodiment of the present invention having multiple video channel functions and additional Out Of Band Management function.

The streaming video security device of the current invention may be implemented in such way that multiple video streams may pass concurrently through a single device through the use of multichannel video encoders-decoders 99x as shown in FIG. 7 below. In addition it is possible to design the device of the current invention in a blade format that fits inside a standard or custom rack thus enabling large scale video security through the use of multiple blades each capable of handling one or more video streams.

It should be noted that the streaming video security device of the current invention may be installed and configured to handle an outgoing streaming video as opposed to incoming video streaming as shown in this example. The reversible structure of device 18 enables installations wherein video is streamed from the classified organization to the non-classified or internet environment. Alternatively, a symmetric version (as discussed above) may be used.

Figure 6:
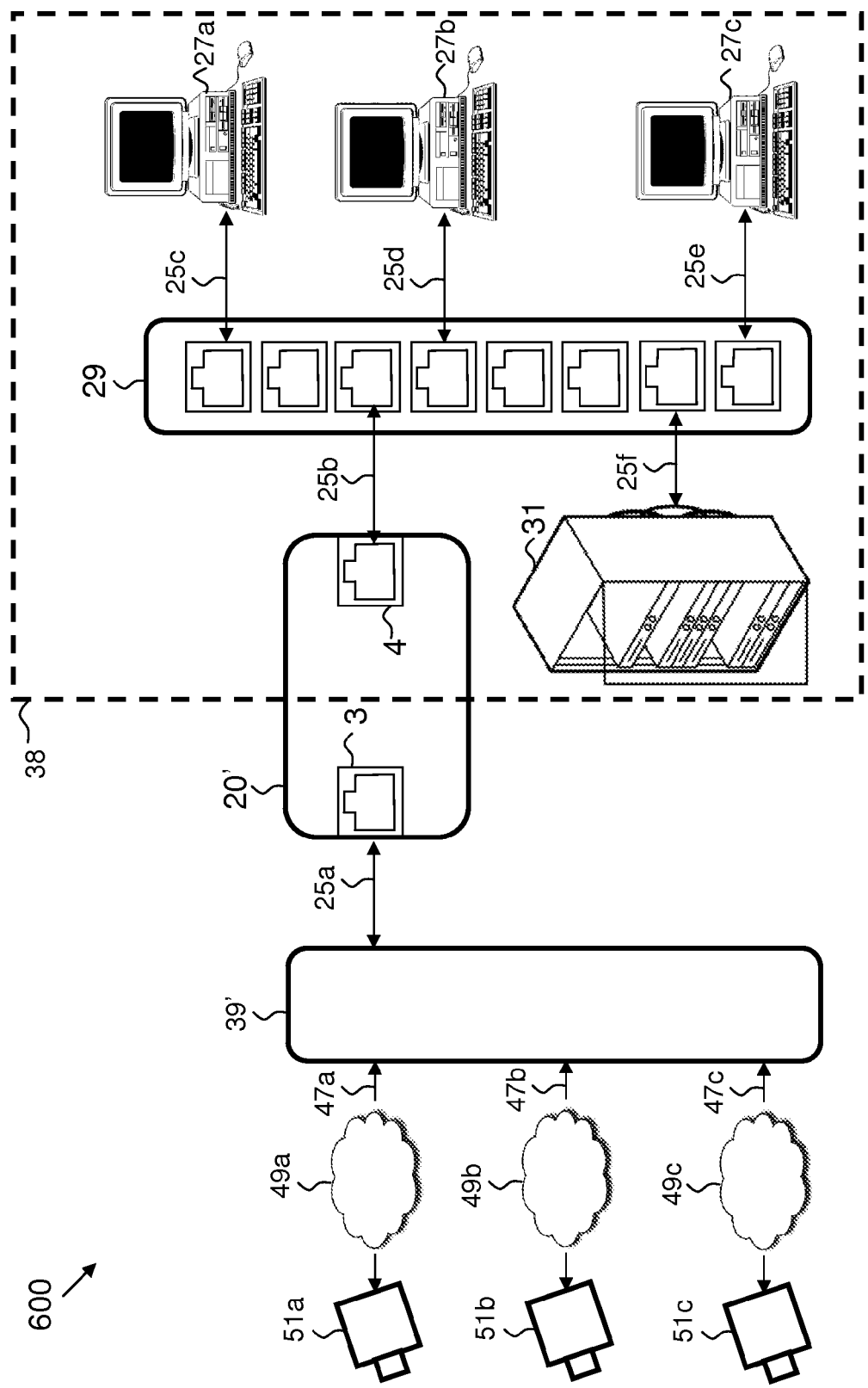
FIG. 6 illustrates a simplified drawing of another remote video streaming system having multiple video stream sources and an exemplary embodiment of the current invention used for streaming video security of multiple channels.

FIG. 6 illustrates a block diagram 600 presenting a multiple-sources remote-streaming video system, having an exemplary streaming video security device 20' of the current invention to secure the classified network 38.

This system 600 is similar to the system 300 of FIG. 3 above but instead of one streaming video source 51, there are multiple streaming video sources 51a, 51b and 51c coupled through non-secured networks 49a to 49c respectively into the router or modem 39' which is connected to the streaming video security device 20'.

The exemplary embodiment 20' of the current invention is used to secure the multiple sources streaming video traffic.

Streaming video security device 20' is coupled to the unsecure networks 49x at one side and to the classified network 38 on the other side to secure the classified network 38.

FIG. 7 illustrates a high-level block-diagram 700 of another exemplary embodiment of the present invention having multiple video channel functions 99x (marked in this figure as 99a, 99b, . . . 99i) and additional Out Of Band Management function 70. In this embodiment of the current invention, the incoming plain-text IP traffic is passed from the input firewall 28 into a managed input LAN switch 67 where each one of the independent video streams is routed to the proper video channel 99x through lines 30x respectively. Each one of the streaming video channel is then converted into a raw video display-compatible output that converted back into streaming video IP traffic (as seen in block 99 seen in FIG. 5 above) that passed through lines 44x respectively to the managed output LAN switch 68. In the managed output LAN switch 68 all incoming streaming video traffic is combined into one physical network that is coupled to the output firewall 46.

Control traffic in the forward and reverse directions is handled in the same way as in FIG. 5 above but in this implementation all IP based commands traffic from all video channels is handled by the same data diodes (55 and 57) and filters (54 and 56). Video embedded meta-data is handled internally by each one of the Video channels 99x as in Video channel 99 in FIG. 5 above.

To enable device configuration, monitoring and diagnostics, the exemplary embodiment of the current invention may also comprise of an optional management function 70.

Optionally, management function 70 is an out of band management function which is coupled to the organization management LAN through lines 71 and the management LAN port 72. The out of band management function 70 may be implemented by using System On a Chip or microcontroller that is coupled to at least one of the other device functions through lines 73x and lines 79x.

Line 73a enables the out of band management function 70 to communicate with the output encryption/decryption function 50. This communication may be used to configure the encryption/decryption function 50, to set keys, to monitor the encryption/decryption process etc.

Line 73b enables the out of band management function 70 to communicate with the output firewall 46. This communication may be used to configure the output firewall 46, to set its rules and policies and to monitor traffic abnormalities and attacks.

Line 73c enables the out of band management function 70 to communicate with the output LAN switch 68. This communication may be used to configure the output LAN switch 68, to create VLAN, to define traffic rules etc.

Lines 79x (79a, 79b, . . . 79i) enable the out of band management function 70 to communicate with the Video channel 99x (99a, 99b and 99i respectively). This communication may be used to configure the video channel 99i, to set video encoding and decoding settings, to configure the meta-data filter 65, to monitor the video and audio traffic, etc.

Lines 73g and 73h enable the out of band management function 70 to communicate with the forward command data channel filter 54 and with the backwards command data channel filter 56 respectively. This communication may be used to configure the filters with rules, black-lists, white-lists etc.

Line 73d enables the out of band management function 70 to communicate with the input LAN switch 67. This communication may be used to configure the output LAN switch 67, to create VLAN, to define traffic rules etc.

Line 73e enables the out of band management function 70 to communicate with the input firewall 28. This communication may be used to configure the output firewall 28, to set its rules and policies and to monitor traffic abnormalities and attacks.

Line 73f enables the out of band management function 70 to communicate with the input encryption/decryption function 24. This communication may be used to configure the input encryption/decryption function 24, to set keys, to monitor the encryption/decryption process etc.

Line 73k enables the out of band management function 70 to communicate with the anti-tampering function 84. This communication may be used to provide alarms on the management LAN when the device 18 is being tampered or physically attacked.

The out of band management function 70 may be further comprise of a Power Over Ethernet circuitry to enable independent supply of power to the management functions even when the device 18 is powered off.

The out of band management function 70 may further comprise of a non-volatile memory that is capable of storing system log information. Log information may be supplied by each one of the device coupled module to indicate an event or exception. For example input firewall function 28 may send blocked packet information through line 73e into the Out Of Band management 70 to be stored at the said non-volatile memory. Such information may be accessible through the management LAN port 72 to enable remote reporting, statistics, alarms, analysis etc.

The out of band management function 70 may be further comprises of asset management functions to support an automated enterprise level asset management.

In some embodiments of the current invention, the management function is not coupled into a separate management LAN but it is coupled to the input or output LAN and therefore it is not considered out-of band management.

Figure 8:
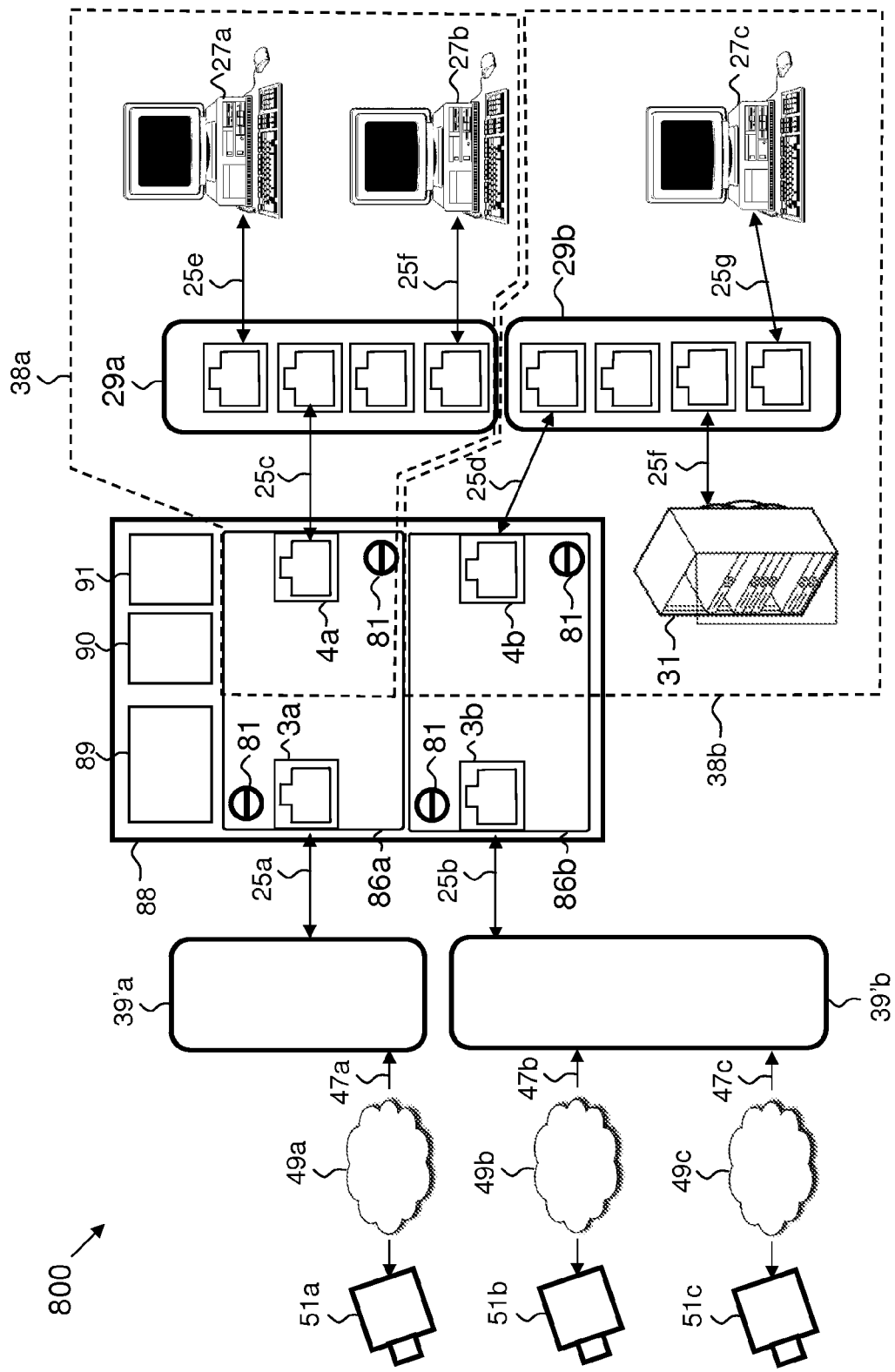
FIG. 8 illustrates a simplified drawing of yet another remote video streaming system having multiple video stream sources and an exemplary embodiment of the current invention in blade form-factor used for streaming video security of multiple isolated channels.

FIG. 8 illustrates a block diagram 800 presenting a multiple sources remote streaming video system having an exemplary blade form-factor device 86x of the current invention to secure the two isolated classified networks 38a and 38b. Only two blades shown in this figure for simplicity though typical blade chassis 88 of the current invention may comprise of up to 20 blades to achieve higher densities.

This system 800 is similar to the system 600 of FIG. 6 above but instead of one router or modem 39', there are two routers or modems: router 39'a is coupled to video source 51a, router and 39'b coupled to video sources 51b and 51c.

Blade chassis 88 contains two blades 86a and 86b wherein each one of these blades is similar to the streaming video security device 18 of FIG. 5 above, 20' of FIG. 6 above or 18' of FIG. 7 above. Each streaming video security blades 86x is having an input LAN interface 3x and output LAN interface 4x. Power to the streaming video security blades 86X is supplied by a main chassis power supply 89 that is preferably designed for hot swapping to facilitate easier maintenance without the need to shutdown the whole chassis 88.

Screws or Dzus fasteners 81 (see http://www.dzusfasteners.net/) enables easy removal of the streaming video security blades 86X through board to board connectors at the back of each blade 86X and a backplane fixed to the chassis 88.

Optional chassis management module 90 is coupled to each one of the streaming video security blades 86x Out Of Band Management functions 70 as seen in FIG. 7 above. This module enables a unified management interface to the whole chassis through one user interface. Remote user interface may be web based over management LAN coupled to the chassis management module 90 similar to LAN interface 72 of FIG. 7 above.

Optional chassis video switch module 91 is coupled to each one of the streaming video security blades 86x optional local video output 36 of FIG. 5 above on one side and to one or more user displays on the other side. The chassis video switch module 91 enables the local display to show video output from each one of the streaming video security blades 86i based on user selection.

LAN output jack 4a of streaming video security blade 86a is coupled through LAN cable 25c to first LAN switch 29a. First LAN switch 29a is coupled through LAN cable 25e to computer 27a, and coupled through LAN cable 25f to computer 27a. The first streaming video security blade 86a, LAN switch 29a and computers 27a and 27b are part of first classified network 38a.

Similarly, streaming video security blade 86b LAN output jack 4b is coupled through LAN cable 25d to second LAN switch 29b. Second LAN switch 29b is coupled through LAN cable 25g to computer 27c, and is coupled through LAN cable 25f to server or storage rack 31. The second streaming video security blade 86b, LAN switch 29b and computer 27c and server or storage rack 31 are part of second classified network 38b.

First classified network 38a and second classified network 38b are fully isolated to enable security segmentation or different levels of security at the same organization. This arrangement may be needed to support large number of incoming and outgoing video streams coupled to multiple isolated networks. Typical application is a modern operations or mission control room that is coupled to large number of remote sensors such as surveillance cameras, airborne sensors, radars etc. It should be noted that other elements of system 800 (e.g. modems and switches) may have blade form-factor and may reside in the same rack or different racks.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

As used herein, the term "computer", processor or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

The invention claimed is:

1. A streaming video security device comprising:
an input LAN port for receiving packet-based streaming video input indicative of a video signal;
at least one streaming video decoder for receiving said streaming video input from said input LAN port and converting said streaming video input to raw video display-compatible output, said raw video display-compatible output comprising only non-packet-based image data;
at least one streaming video encoder for receiving said raw video display-compatible output and outputting safe video streaming packets;
at least one unidirectional data flow element having an input connected directly to an output of said at least one streaming video decoder and having an output connected directly to an input of said at least one streaming video encoder, said at least one unidirectional data flow element being configured to enforce transmission of said non-packet-based raw video display-compatible output only in the direction from said at least one streaming video decoder to said at least one streaming video encoder;
an output LAN port for transmitting said safe video streaming packets;

wherein said streaming video input indicative of a video signal undergoes conversion to said raw video display-compatible signal and then converted back to said streaming video output within the streaming video security device to thereby eliminate any malicious data or malicious code from the streaming video output, and wherein said at least one unidirectional data flow element provides isolation between said at least one streaming video decoder and said at least one streaming video encoder.

2. The device of claim 1, wherein said raw video display-compatible input and output are selected from a group consisting of: ITU-R BT.656, VGA, DVI, HDMI, and LCD interface.

3. The device of claim 2, wherein said raw video display-compatible input and output are selected from a group consisting of: ITU-R and VGA standards.

4. The device of claim 1, and further comprising:
an input firewall connected between said input LAN port and said at least one streaming video encoder; and
an output firewall connected between said output LAN port and said at least one streaming video encoder;
wherein said input firewall is configured to:
sort out non video packets from a stream of packets arriving from said input LAN port;
analyze said non video packets and reject unsafe packets; and
transfer only safe non video packets to said output firewall function, and
wherein said output firewall is configured to:
sort out non video packets from a stream of packets arriving from said output LAN port;
analyze said non video packets and rejecting unsafe packets; and
transfer only safe non video packets to said input firewall.

5. The device of claim 4, further comprising at least one data filter connected between said input firewall and said output firewall, said data filter being configured to pass only predefined traffic based on programmed rules.

6. The device of claim 5, further comprising at least one data diode connected in series with said at least one data filter, wherein said data diode is configured to enforce data flow only in one direction.

7. The device of claim 4, further comprising a dedicated command channel for transmitting commands from said output LAN port to said input LAN port, said dedicated command channel comprising a data diode connected between said output firewall function and said input firewall function for forcing data flow only in the direction from said output firewall function to said input firewall function.

8. The device of claim 7, wherein said commands transmitted from said output LAN port to said input LAN port are restricted to camera control command.

9. The device of claim 1, further comprising a decryption function connected between said input LAN port and said at least one streaming video decoder, wherein said decryption function is configured to decrypt incoming encrypted streaming plain-text IP traffic.

10. The device of claim 1, and further comprising an output encryption/decryption function connected between said at least one streaming video encoder and said output LAN port configured to encrypt said streaming video output.

11. The device of claim 1, further comprising an auxiliary display interface coupled to said raw video display-compatible output configured to connect a local display to said streaming video security device.

12. The device of claim 1, further comprising forward meta-data filter for filtering video embedded meta-data based on preprogrammed criteria and passing said filtered video embedded meta-data from said at least one streaming video decoder to said at least one streaming video encoder.

13. The device of claim 12, further comprising at least one data diode connected in series with said at least one data filter, wherein said data diode configured to enforce data flow only in one direction.

14. The device of claim 1, further comprising a galvanic isolator, providing galvanic isolation between said input LAN port and said output LAN port, wherein said galvanic isolator is selected from a group consisting of: an optical isolator, a transformer, a Radio Frequency isolator and a differential signal pair.

15. The device of claim 1, and further comprising a management function providing at least one service selected from a group consisting of: security keys loading, and alarms.

16. The device of claim 15, wherein said management function is an out-of-band management connected to a management LAN via a separate LAN port.

17. The device of claim 15, further comprising a log function having a non-volatile memory configured to capture, store, and report normal or abnormal device events based on predefined criteria.

18. The device of claim 1, further comprising:
a housing configured to house the components of the streaming video security device;
at least one intrusion sensor configured to sense a mechanical intrusion attempt to internal circuitry of the streaming video security device; and
an anti-tampering circuitry coupled to said at least one intrusion sensor,
wherein said anti-tampering circuitry is configured to permanently disable at least one of a plurality of functions of the streaming video security device as a result of sensing an intrusion attempt.

19. The device of claim 18, wherein said anti-tampering circuitry further comprises an independent power source selected from a group consisting of: a battery, and a super-capacitor.

20. The device of claim 1, wherein said unidirectional data flow element further comprises a video transmitter and a video receiver pair, wherein said video transmitter is coupled to said at least one streaming video decoder and said at least one video receiver is coupled to said at least one streaming video encoder, and wherein said video transmitter and said video receiver are linked together.

21. The device of claim 1, further comprising at least one secure unidirectional audio channel to securely pass audio signals from said at least one streaming video decoder to said at least one streaming video encoder, wherein:
said at least one streaming video decoder is configured to separate audio data from said streaming video input,
said at least one streaming video decoder further comprises a streaming audio output for outputting said audio data separated from said streaming video input, and said at least one streaming video encoder combines input audio data into said streaming video output, said at least one streaming video encoder further comprises a streaming audio input for receiving said input audio data,
said secure unidirectional audio channel comprising:
an input audio CODEC configured to receive said streaming audio data from said streaming audio output and convert said audio data into an analog audio stream;

an output audio CODEC configured to convert said analog audio stream to input audio streaming data and transmit said input audio streaming data to said streaming audio input of said at least one streaming video encoder; and an audio unidirectional flow enforcing element configured to force flow of said analog audio stream in the direction from said input audio CODEC to said output CODEC only.

22. The device of claim 1, wherein the device has a modular blade form-factor, configured to be inserted into a modular blade chassis.

23. The device of claim 1, wherein at least one of said at least one streaming video decoder and said at least one streaming video encoder are further configured to detect abnormal incoming video frames behavior based on predefined rules, wherein upon detection of an abnormal traffic, said at least one of said at least one streaming video decoder and said at least one streaming video encoder discards that traffic and does not pass the discarded traffic to the device output.

24. A secure video streaming system comprising:
at least a first secured network;
at least a first unsecured network; and
at least a first streaming video security device, connected between said at least first secured network and said at least first unsecured network, said first streaming video security device comprising:
an input LAN port configured to receive a packet-based streaming video input indicative of a video signal;
at least one streaming video decoder coupled at one side to said input LAN port and for generating raw video display-compatible output, said raw video display-compatible output comprising only non-packet-based image data;
an output LAN port configured to transmit streaming video output to be displayed on a display device;
at least one streaming video encoder coupled at one side to said output LAN port and at another side, coupled to the at least one streaming video decoder to receive said raw video display-compatible output and convert said received raw video display-compatible output to video streaming output; and
at least one unidirectional data flow element connected directly to an output of said at least one streaming video decoder and connected directly to an input of said at least one video encoder configured to enforce transmission of said raw video display-compatible output only in the direction from said at least one streaming video decoder to said at least one streaming video encoder,
wherein said packet-based streaming video input indicative of a video signal undergoes conversion to said non-packet-based raw video display-compatible signal and then converted back to said streaming video output within said at least a first streaming video security device to thereby eliminate any malicious data or malicious code from the streaming video output, and
wherein said at least one unidirectional data flow element provides isolation between said at least one streaming video decoder and said at least one streaming video encoder.

25. The system of claim 24 and further comprising:
a second secured network;
a second unsecured network;
a second streaming video security device, connected between said second unsecured network and said second secured network; and
a blade chassis,
wherein said first streaming video security device and said second streaming video security device have a blade form-factor and are inserted into said blade chassis.

26. The device of claim 1, wherein said at least one streaming video decoder and said at least one streaming video encoder form a decoder-encoder pair, wherein said decoder-encoder pair is used for a single video channel, such that streaming video encoder received raw video display-compatible output only from the steaming video decoder in said decoder-encoder pair.

* * * * *